E. J. M. JANVIER.
PURIFICATION OF LIQUID AND SOLID MATERIALS.
APPLICATION FILED JAN. 29, 1913.
1,214,166.
Patented Jan. 30, 1917.
2 SHEETS—SHEET 1.
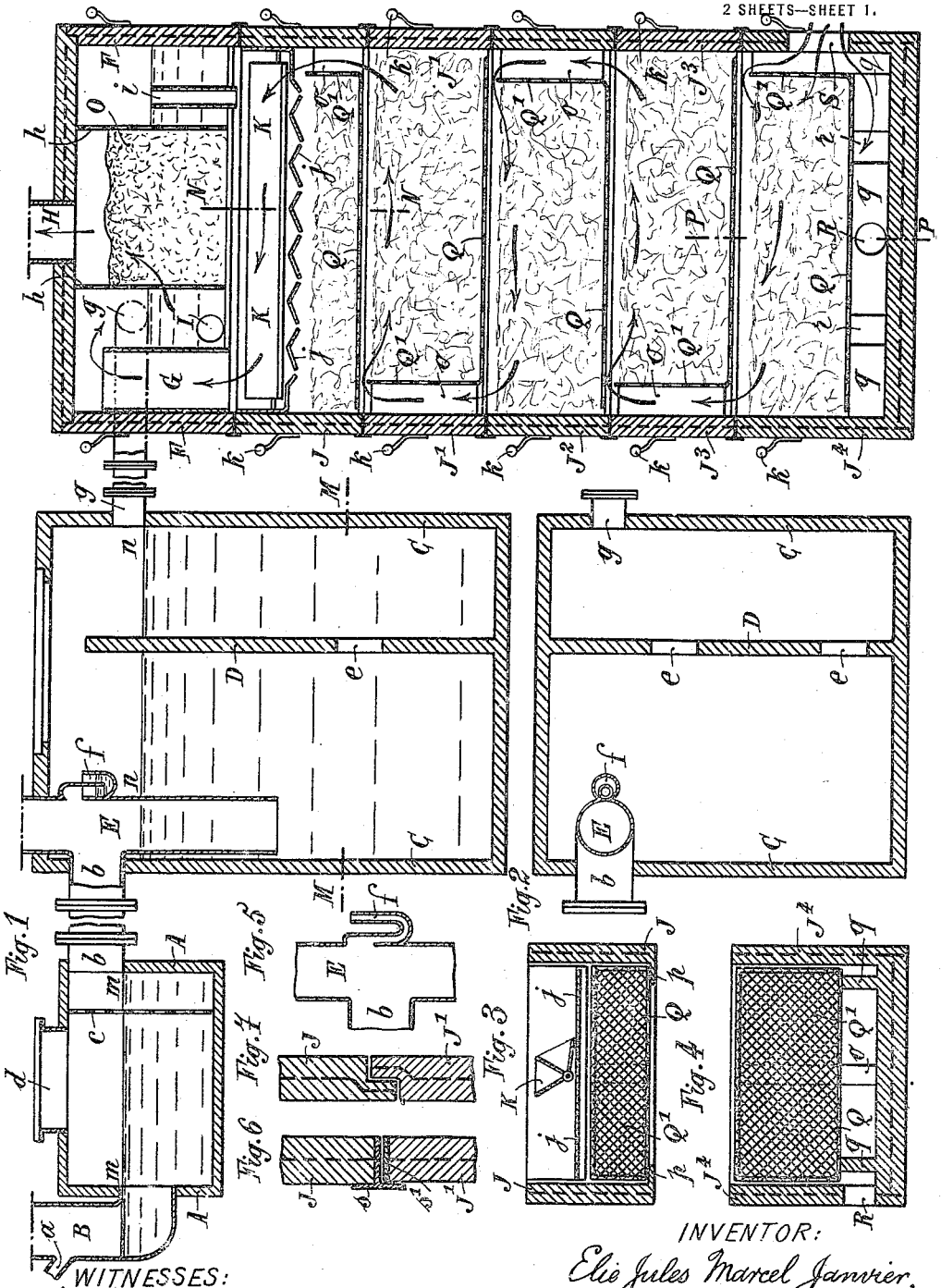
INVENTOR:
Elie Jules Marcel Janvier,
By Attorneys, E. J. M. JANVIER.
PURIFICATION OF LIQUID AND SOLID MATERIALS.
APPLICATION FILED JAN. 29, 1913.
1,214,166.
Patented Jan. 30, 1917.
2 SHEETS—SHEET 2.
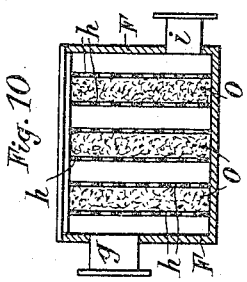
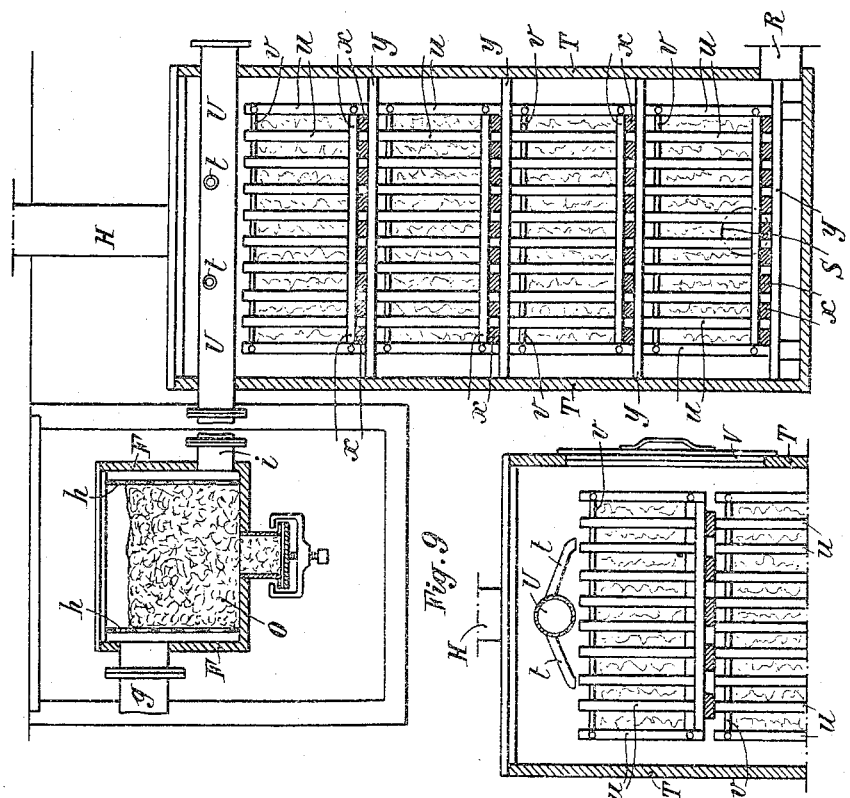
WITNESSES:
Fred White
René Puine
INVENTOR:
Elie Jules Marcel Janvier,
By Attorneys,
Fraser Turk & Myers

UNITED STATES PATENT OFFICE.

ELIE JULES MARCEL JANVIER, OF PARIS, FRANCE.

PURIFICATION OF LIQUID AND SOLID MATERIALS.

1,214,166.

Specification of Letters Patent.

Patented Jan. 30, 1917.

Application filed January 29, 1913. Serial No. 744,813.

*To all whom it may concern:*

Be it known that I, ELIE JULES MARCEL JANVIER, a citizen of the Republic of France, residing in Paris, France, have invented new and useful Improvements in and Relating to the Purification of Liquid and Solid Materials, of which the following is a specification.

The present invention relates to the purification of liquid and solid materials and has for its object to provide improved apparatus adapted for the continuous and automatic purification of waste material such as feces, urine, waste liquids, liquid sewage and the like.

The improved system of filtration which effects the disintegration of the material to be treated as in previous systems comprises a separating apparatus arranged in front of the septic tank and adapted to receive and retain any solid bodies which could not be disintegrated. The actual filtering apparatus of the system is located on the other side of the septic tank and includes a preliminary sieve or strainer. The filtering apparatus is composed of removable elements so as to facilitate transport and storage, these elements being in the form of filtering chambers or casings superposed one upon the other in tiers with suitable provision for the circulation of air.

The invention is illustrated in the accompanying drawings, wherein,—

Figure 1 is a general view in section of the whole apparatus; Fig. 2 is a sectional plan view along the line M—M of the septic tank shown in Fig. 1; Fig. 3 is a transverse sectional view along the line N—N of the bacterial filter; Fig. 4 is a vertical view of the same portion of the apparatus along the line P—P; Fig. 5 illustrates a modification of the air trap shown in Fig. 1; Figs. 6 and 7 illustrate details of construction of the trays or boxes J, etc.; Fig. 8 is a view in sectional elevation of a modified form of apparatus in which the strainer or sieve is separate from the rest of the apparatus; Fig. 9 is a view in vertical section of the upper part of the apparatus shown in Fig. 8; and Fig. 10 illustrates a modified form of strainer.

Referring now to the drawings, the material to be treated enters the apparatus through the fall pipe B and passes into a chamber A composed of ferro-concrete, cast iron, pottery or other suitable material, a pipe $a$ being provided through which a current of water is intermittently discharged for the purpose of carrying the material into a septic tank C through a pipe $b$, a grating or strainer $c$ being provided for the purpose of retaining the solid heavy material which can be removed through a manhole $d$. The normal level of the liquid in the tank C is indicated at $m$ $m$ and is arranged to be somewhat above the normal level indicated at $n$ $n$ of the liquid in the tank C in which the disintegration of the material occurs. The tank C is provided with a separating partition D having openings $e$ therein and serves to localize the fermentation and to permit liquid only to pass through the openings $e$, the partition D rising almost to the top of the tank C. A pipe E projects into the upper portion of the tank C and extends below the surface of the liquid contained in the tank, the pipe $b$ leading from the chamber A entering the pipe E. The pipe E constitutes an aeration pipe by means of a U-shaped tube $f$ which normally filled with water constitutes a safety valve and permits the escape of the gases generated in the tank C.

An alternative form of construction of the safety valve $f$ is illustrated in Fig. 5.

The liquid resulting from the fermentation of the materials treated passes from the tank C by means of a pipe $g$ and enters a sieve or strainer which is arranged in front of the bacterial filter. The sieve or strainer above referred to comprises a chamber F provided with two internal perforated partitions $h$ $h$ between which sand, slag, coke or other filtering material indicated at O is interposed. The liquid coming from the tank C through the pipe $g$ traverses the filtering material O, subsequently leaving the strainer through one or more pipes $i$ from which the liquid freed from its principal impurities passes into the filter proper.

The upper portion of the filtering plant which has just been described and which forms the disintegrating apparatus is provided with an aeration pipe G and a top piece H having a chimney thereon, a trap door I being provided for enabling the solid matter retained by the filtering material O to be removed when desired.

The second portion J of the filtering plant is provided at the top with a longitudinal trough K which serves to distribute automatically the liquid over the whole surface of a perforated and corrugated plate $j$. The partly purified liquid is thus intermittently delivered to the top layer of the filtering material of the portion J of the apparatus. Trays $J^1$, $J^2$, $J^3$, $J^4$ are arranged beneath the tray J and are adapted to contain filtering material. The trays or casings are provided with handles $k$ for convenience in removing and replacing the trays, which are formed of ferro-concrete or any other suitable material.

The bed or layer of filtering material in each of the trays J $J^1$, etc., is formed in the following manner:—At the bottom of each tray is placed a grating Q resting upon ribs or projections $p$. Each grating is provided with an upturned end $Q^1$ forming a perforated wall separated from the wall of the casing by a vertical space $o$ in such a manner as to permit air to pass through the bottom of the grating Q, to circulate through the filtering material supported upon the grating and to pass through the portion $Q^1$ of the grating and also to circulate within the space formed between the vertical portion $Q^1$ of the grating and the end wall of the casing. It will be observed that the portions Q $Q^1$ of the gratings to the different casings $J^1$ $J^2$, etc., are staggered in position so that the air entering the lowest casing is forced to follow a sinuous path through the superposed beds of filtering material and thus insure a thorough treatment of the liquid during filtration. The lowest casing $J^4$ of the series which receives the finally purified liquid is provided with an outlet R; the grating Q rests upon supports $q$ the air entering through a large opening S and passing through openings $r$ in such a manner as to be admitted to the underside of the grating Q and the vertical portion $Q^1$ of the latter, the air after passing through the filtering material rising from the last stage and passing through the next successive stage in a similar manner.

The superposed trays or casings J $J^1$, etc., of the filtering apparatus are supported one above another by their upper and lower edges. A modification of this arrangement is illustrated in Fig. 6 in which the casing base is constituted by a framework composed of iron bar of T section indicated at $s$ connected with the metallic frame work of the casing which is composed of ferro-concrete, the head of this framework being either inside or outside the casing. The upper portion of the casing is in this case constituted by a plain iron plate $s^1$. A further modification is illustrated in Fig. 7 which facilitates building one casing upon another and is particularly suitable for casings composed of cement. The strainer in the modification illustrated in Figs. 8 and 9 comprises two gratings $h$ arranged in the chamber F between which the filtering material O is interposed, and, if desired, the strainer may comprise a larger number of perforated partitions or gratings $h$ $h$ between alternate pairs of which the filtering material is located as shown in Fig. 10.

The liquid issuing from the pipe or outlet $i$ enters at the top of a vertical chamber T in which are arranged one above another a number of perforated trays or baskets containing the filtering material, the liquid entering through an upper pipe U to which are connected two conduits $t$ which serve to scatter or distribute the liquid over the whole surface of the filtering material. Since there is no contact between the filtering material and the walls of the apparatus aeration is insured between and around each basket or tray, each of the trays has its sides formed by uprights $u$ composed of ferro-concrete or wood stayed above and below by transverse bars $v$, the bottom of each tray being formed by crossed bars $z$. The several trays are separated by gratings $y$ and manholes V with covers are provided permitting access to the trays of filtering material. The air inlet is indicated at S and the outlet passage or ventilating flue is indicated at H.

Claims.

1. A sewage disposal apparatus comprising a stack of receptacles, said receptacles being separate and adapted to fit one on top of another, said receptacles having a grate, a relatively thick layer of filtering material in said grate, said grate having a perforated bottom and a perforated upright portion spaced from one end of the receptacles adapted to permit air to horizontally penetrate the mass of the material in said receptacle for facilitating the oxidation of the sewage.

2. A sewage disposal apparatus comprising a stack of receptacles adapted to contain filtering material, one of said receptacles having a vertical screen therein adapted to prevent passage of solid insoluble matter, and the other receptacles having grates supporting a relatively thick layer of filtering material, said grates having a perforated bottom and a perforated upright portion spaced from one end of the receptacles, the space between the end of the receptacle and upright portion of the grate being adapted to permit air to horizontally penetrate the mass of the material in the receptacle for facilitating the oxidation of the sewage.

3. A sewage disposal apparatus comprising a stack of receptacles, one of said receptacles having two vertical perforated walls therein and a charge of filtering material between said vertical perforated walls, liquid entering the receptacle being adapted to flow through the filtering material between said perforated plates, and other receptacles having grates supporting a relatively thick layer of filtering material, said grates having a perforated bottom and a perforated upright portion spaced from one end of the receptacles, the space between the end of the receptacle and upright portion of the grate being adapted to permit air to horizontally penetrate the mass of the material in the receptacle for facilitating the oxidation of the sewage.

In witness whereof, I have hereunto signed my name in the presence of two subscribing witnesses.

ELIE JULES MARCEL JANVIER.

Witnesses:
  HANSON C. COXE,
  RENE BAROLY.

Copies of this patent may be obtained for five cents each, by addressing the "Commissioner of Patents, Washington, D. C."